(12) United States Patent
Moon et al.

(10) Patent No.: US 10,000,391 B2
(45) Date of Patent: Jun. 19, 2018

(54) OIL-WATER SEPARATION STRUCTURE, METHOD OF PREPARING THE SAME, OIL-WATER SEPARATOR, AND OIL-WATER SEPARATION METHOD USING OIL-WATER SEPARATOR

(71) Applicant: KOREA INSTITUTE OF SCIENCE AND TECHNOLOGY, Seoul (KR)

(72) Inventors: Myoung Woon Moon, Seoul (KR); Heon Ju Lee, Seoul (KR); Tae Jun Ko, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 535 days.

(21) Appl. No.: 14/660,650

(22) Filed: Mar. 17, 2015

(65) Prior Publication Data
US 2015/0259221 A1    Sep. 17, 2015

(30) Foreign Application Priority Data

Mar. 17, 2014 (KR) .................. 10-2014-0031150
Apr. 7, 2014 (KR) .................. 10-2014-0041513

(51) Int. Cl.
*B01D 17/00* (2006.01)
*C02F 1/28* (2006.01)
(Continued)

(52) U.S. Cl.
CPC ............ *C02F 1/281* (2013.01); *B01D 17/045* (2013.01); *B01D 17/08* (2013.01); *B01D 17/10* (2013.01);
(Continued)

(58) Field of Classification Search
CPC ........ B01D 39/00; B01D 39/08; B01D 39/10; B01D 39/083; B01D 39/16;
(Continued)

(56) References Cited

U.S. PATENT DOCUMENTS

| 5,753,014 A | 5/1998 | Rijn et al. |
| 2006/0159916 A1 | 7/2006 | Dubrow et al. |

(Continued)

FOREIGN PATENT DOCUMENTS

| KR | 10-2009-0011279 A | 2/2009 |
| KR | 20110032126 A | 3/2011 |

(Continued)

OTHER PUBLICATIONS

Changrui Gao et al., Integrated oil separation and water purification by a double-layer TiO2-based mesh. Energy & Environmental Science. Feb. 1, 2013, pp. 1147-1151, vol. 6.

(Continued)

*Primary Examiner* — Allison G Fitzsimmons
(74) *Attorney, Agent, or Firm* — Goldilocks zone IP law (57) ABSTRACT

Provided is an oil-water separation structure, a method of manufacturing the same, an oil-water separator including the oil-water separation structure, and an oil-water separation method using the oil-water separator. The oil-water separation structure includes a porous substrate including a plurality of protrusions forming a nano-pattern on at least one surface; and an inorganic particle disposed at an end of at least some portions of the protrusions. The oil-water separation structure has hydrophilic or superhydrophilic surface properties to selectively filter out water and easily separate and retrieve oil from a mixture of water and oil. A manufacturing process of the oil-water separation structure is environmentally friendly and the oil-water separation structure may be manufactured into a large surface area. The oil-water separator including the oil-water separation structure may be repeatedly used and prevent additional environmental pollution.

22 Claims, 10 Drawing Sheets

(51) Int. Cl.
  *B01D 17/04* (2006.01)
  *C02F 1/40* (2006.01)
  *C02F 101/32* (2006.01)
  *C02F 103/08* (2006.01)
  *C02F 103/00* (2006.01)

(52) U.S. Cl.
  CPC .............. *C02F 1/288* (2013.01); *C02F 1/285* (2013.01); *C02F 1/40* (2013.01); *C02F 2101/32* (2013.01); *C02F 2103/007* (2013.01); *C02F 2103/08* (2013.01); *C02F 2305/08* (2013.01)

(58) Field of Classification Search
  CPC .... B01D 39/1692; B01D 17/00; B01D 17/02; B01D 17/10; B01D 17/08; B01D 17/04; B01D 17/045; C02F 1/00; C02F 1/40; C02F 1/28; C02F 1/281; C02F 1/285; C02F 1/288; C02F 2101/32; C02F 2305/08; C02F 2103/007; C02F 2103/08
  USPC ..... 210/600, 634, 767, 799, 500.21, 500.25, 210/502.1, 504, 505, 508, 509
  See application file for complete search history.

(56) References Cited

U.S. PATENT DOCUMENTS

| | | | |
|---|---|---|---|
| 2008/0110820 A1* | 5/2008 | Knipmeyer | ............ C02F 1/003 210/474 |
| 2009/0114594 A1 | 5/2009 | Sirkar et al. | |
| 2010/0050871 A1 | 3/2010 | Moy et al. | |
| 2010/0270233 A1 | 10/2010 | Kim et al. | |
| 2011/0124941 A1 | 5/2011 | Verdegan et al. | |
| 2012/0000853 A1 | 1/2012 | Tuteja et al. | |
| 2012/0037560 A1* | 2/2012 | Ginley | ............... B01D 39/1676 210/446 |
| 2012/0223011 A1 | 9/2012 | Moon et al. | |
| 2015/0284269 A1 | 10/2015 | Hwang et al. | |

FOREIGN PATENT DOCUMENTS

| | | |
|---|---|---|
| KR | 1020110100828 A | 9/2011 |
| KR | 10-2012-0100319 A | 9/2012 |
| KR | 101217783 B1 | 12/2012 |
| KR | 101275909 B1 | 6/2013 |
| KR | 101311851 B1 | 9/2013 |
| KR | 20140002971 A | 1/2014 |
| WO | 2011068266 A1 | 6/2011 |
| WO | 2012-088209 A2 | 6/2012 |
| WO | 2012156800 A2 | 11/2012 |

OTHER PUBLICATIONS

Communications of 2nd Korean Office Action dated Aug. 29, 2016 of Korean Patent Application No. 10-2014-0041513, which corresponds to this application.
Shuchen Hsieh et al.,Plasma induced patterning of polydimethylsiloxane surfaces, Materials Science and Engineering B, 2009, pp. 156 (18-23),Elsevier.
A European Search Report dated Mar. 4, 2016, corresponds to Europena Patent Application No. 15159488.4.
European Search Report dated Sep. 4, 2015. Corresponds to European Patent Application No. 15159488.4.

* cited by examiner

BEFORE PLASMA TREATMENT

FIG. 8B

AFTER PLASMA TREATMENT

FIG. 8C

FIG. 9A
BEFORE PLASMA TREATMENT

FIG. 9B
AFTER PLASMA TREATMENT

FIG. 9C
BEFORE PLASMA TREATMENT

FIG. 9D
AFTER PLASMA TREATMENT

BEFORE PLASMA TREATMENT

FIG. 10B

AFTER PLASMA TREATMENT

FIG. 11A

BEFORE PLASMA TREATMENT

FIG. 11B

AFTER PLASMA TREATMENT

OIL-WATER SEPARATION STRUCTURE, METHOD OF PREPARING THE SAME, OIL-WATER SEPARATOR, AND OIL-WATER SEPARATION METHOD USING OIL-WATER SEPARATOR

RELATED APPLICATION

This application claims the benefit of Korean Patent Applications No. 10-2014-0041513, filed on Apr. 7, 2014, and 10-2014-0031150, filed on Mar. 17, 2014, in the Korean Intellectual Property Office, the disclosure of which is incorporated herein in its entirety by reference.

BACKGROUND

1. Field

One or more embodiments of the present invention relate to an oil-water separation structure having a nano-patterned structure on a surface thereof, a method of manufacturing the oil-water separation structure, an oil-water separator including the oil-water separation structure, and an oil-water separation method using the oil-water separator.

2. Description of the Related Art

Technology for removing oil spilled in the sea or the river includes adjusting surface energy, such as hydrophilicity and hydrophobicity of a surface of a separator to separate and remove oil that was spilled from the water.

Technology for separating oil and water (hereinafter, oil-water separation technology) may be largely categorized into two groups. The first group involves using a superoleophilic and superhydrophobic filter having low surface energy, which lets oil flow out but prevents water from flowing out, and the second group involves using an hydrophilic or superhydrophilic filter having high surface energy, which lets water flow out but prevents oil from flowing out due to a water membrane formed on the filter. To selectively separate and retrieve oil from a mixture of oil and water, a filter that operates based on the second technology may be more useful. In this regard, technology for hydrophilizing the filter is needed.

As a method of forming a hydrophilic or superhydrophilic surface on a surface of a material, wet etching, UV treatment, plasma/ion treatment, or the like may be used. More particularly, it is known that when a material having an increased surface roughness and hydrophilicity is used to control chemical properties of the surface, a hydrophilic or superhydrophilic surface may be obtained.

However, despite efforts to achieve hydrophilic properties on surfaces of various materials and thin films, the hydrophilicity of a surface of a general material disappears easily over time. This is because water molecules or fine particles such as or hydrocarbons in the air tend to easily bind to a hydrophilic surface due to relatively high surface energy of the hydrophilic surface, in order to decrease surface energy of the hydrophilic surface, and as a result of such binding, surface energy of the hydrophilic surface decreases and the hydrophilic surface loses hydrophilicity. Effects obtained from most hydrophilic or superhydrophilic treatments known in the art are lost within a few hours or a few days, and thus, lots of research into developing a surface that retains hydrophilicity or superhydrophilicity for a longer time is under progress. Also, manufacturing the hydrophilic or superhydrophilic surface into large surface area and mass production for manufacturing the hydrophilic or superhydrophilic surface are required.

As environmental problems are being raised due to the sophistication of industries, research into materials for separating and/or removing specific materials from mixtures, such as oil-water separator and seawater desalinating apparatus, are continually increasing. Also, lots of research is under progress for developing an oil-water separation method in which when an oil spillage accident occurs, crude oil is primarily retrieved, the retrieved crude oil may be reused, and secondary environmental pollution is not induced during the retrieval process.

Accordingly, an oil-water separation structure having a large surface area, for which a manufacturing process thereof is environmentally friendly and a durability of the structure is excellent, is needed.

SUMMARY

One or more embodiments include an oil-water separation structure having a large surface area and having improved durability.

One or more embodiments include an oil-water separator including the oil-water separation structure.

One or more embodiments include a method of manufacturing the oil-water separation structure.

One or more embodiments include an oil-water separation method using the oil-water separator.

Additional aspects will be set forth in part in the description which follows and, in part, will be apparent from the description, or may be learned by practice of the embodiments.

According to one or more embodiments, an oil-water separation structure includes a porous substrate comprising a plurality of protrusions forming a nano-pattern on at least one surface; and an inorganic particle disposed at an end of at least some portions of the protrusion.

According to an embodiment, the substrate may be a non-woven fabric, a woven fabric, or a net shape.

According to an embodiment, the substrate may have a curved shape and the nano-pattern is formed on at least some concave portions of the curved shape.

According to an embodiment, the substrate may include at least one selected from a plastic, a fiber, a glass, a metal, a ceramic, and a carbon-based material.

According to an embodiment, the protrusion may have a shape of nano-hair, nano-fiber, nano-pillar, nano-rod, or nano-wire.

According to an embodiment, the inorganic particle may include at least one selected from titanium (Ti), copper (Cu), gold (Au), silver (Ag), chromium (Cr), platinum (Pt), iron (Fe), aluminum (Al), silicon (Si), an alloy thereof, and an oxide thereof, and the inorganic particle may include $TiO_2$.

According to an embodiment, the oil-water separation structure may have a contact angle of 20° or less with respect to water in air, and the oil-water separation structure may have a contact angle of 140° or greater with respect to oil in water.

According to one or more embodiments, an oil-water separator includes the oil-water separation structure.

According to an embodiment, the oil-water separator may be a landing net including the oil-water separation structure and a support frame for fixing the oil-water separation structure. The landing net may only scoop out oil from a mixture of water and oil.

According to an embodiment, the oil-water separation structure may be applied to an oil fence.

According to one or more embodiments, a method of manufacturing an oil-water separation structure includes providing a porous substrate; placing a metal net structure above the substrate; and plasma treating the substrate on which the metal net structure is placed.

According to an embodiment, the substrate may have a non-woven fabric, a woven fabric, or a net shape.

According to an embodiment, the substrate may include at least one selected from a plastic, a fiber, a glass, a metal, a ceramic, and a carbon-based material.

According to an embodiment, the metal net structure may include at least one selected from titanium (Ti), copper (Cu), gold (Au), silver (Ag), chromium (Cr), platinum (Pt), iron (Fe), aluminum (Al), silicon (Si), an alloy thereof, and an oxide thereof.

According to an embodiment, the metal net structure may be placed above the substrate with a gap of about 20 mm or less.

According to an embodiment, the plasma treating may include depositing metal or metal oxide particles disposed from the metal net structure on a surface of the substrate through plasma treatment; and etching residual portions other than portions on which the metal or metal oxide particles are deposited from the surface of the substrate through the plasma treatment.

According to an embodiment, the depositing and etching may be simultaneously performed under the same plasma treatment conditions.

According to an embodiment, the plasma treating may be performed in the presence of at least one gas selected from $O_2$, $CF_4$, Ar, $N_2$, and $H_2$.

According to an embodiment, the metal net structure may include titanium (Ti) and the plasma treatment comprises using $O_2$ gas.

According to an embodiment, the plasma treatment may be performed in a voltage range from about −100 V to about −1000 V, for duration from about 10 seconds to about 5 hours under the pressure of about 1 mTorr to about 1000 mTorr.

According to one or more embodiments, an oil-water separation method includes selectively passing water and retrieving oil from a mixture of water and oil by using the oil-water separator.

According to an embodiment, an oil-water separation method may further include pre-treating the oil-water separator by wetting the oil-water separator in water before using the oil-water separator.

According to an embodiment, an oil-water separation method may further include UV treating the oil-water separator after retrieving oil.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

Hereinafter, an oil-water separation structure, a method of manufacturing the same, an oil-water separator including the oil-water separation structure, and an oil-water separation method using the oil-water separator, according to embodiments, will be described in detail with reference to drawings.

An oil-water separation structure according to an embodiment includes
a porous substrate including a plurality of protrusions forming a nano-pattern on at least one surface; and an inorganic particle disposed at an end of at least some portions of the protrusions.

The term "aspect ratio" as used herein of a protrusion describes the proportional relationship between its length and its diameter.

Figure 1:
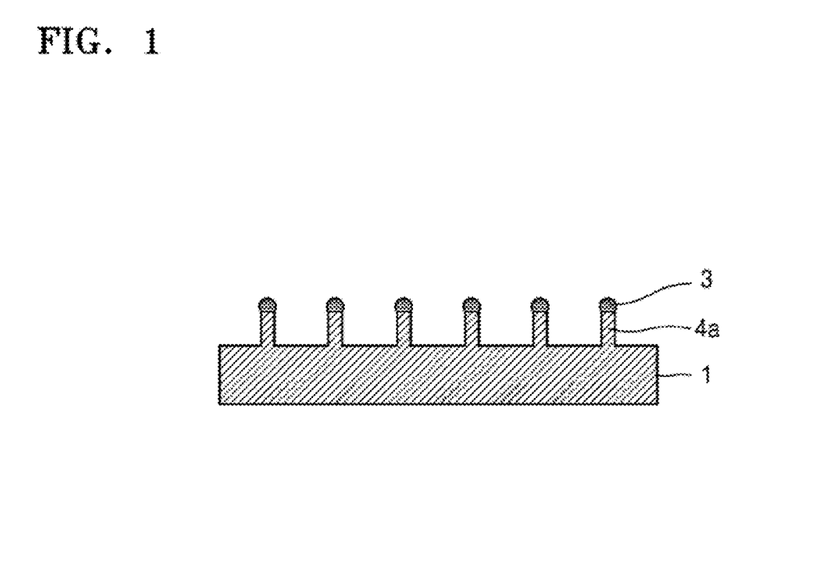
FIG. 1 schematically shows a cross-sectional structure of an oil-water separation structure according to an embodiment.

FIG. 1 schematically shows a cross-sectional structure of an oil-water separation structure according to an embodiment. As shown in FIG. 1, a plurality of nano-sized protrusions 4a are repeatedly disposed with uniform gaps therebetween over the entire surface of the substrate 1 to form a uniform nano-pattern, and an inorganic particle 3 is disposed at an end of the protrusion 4a. In an alternate embodiment, the plurality of nano-sized protrusions 4a are repeatedly disposed with uniform gaps therebetween over a partial surface of the substrate 1 to form a nano-pattern, and an inorganic particle 3 is disposed at an end of the protrusion 4a.

The substrate 1 may have a flat shape or a curved shape. When the substrate 1 has a curved shape, the nano-pattern may be formed on at least some of concave portions of the curved shape. When the substrate 1 has a curved shape, the substrate 1 may have improved retrieval efficiency because water from a mixture of water and oil may be selectively passed therethrough and only oil may be retrieved. Thus, strongly volatile oil may be collected within the curvature, such that a surface area for evaporation of oil may be reduced.

The size of the substrate 1 is not limited and a surface of the substrate 1 may be, for example, 100 cm$^2$ or greater. The substrate 1 may have a large surface area, for example, a surface area of 10 cm×10 cm or greater. A thickness of the substrate 1 is not limited.

A shape of the substrate 1 is not limited as long as the shape is a porous or net structure having pores through which water may pass. The substrate 1 may, for example, have a non-woven fabric, a woven fabric, or a net shape. When the substrate 1 is formed of fiber material, the non-woven fabric shape may be more preferable. When the substrate 1 is formed of a material having strength beyond a certain level, the substrate 1 may be formed into a net shape or a woven fabric shape. The substrate 1 having a net shape may, for example, have a mesh net shape having about 10 Mesh to about 500 Mesh size based on Tyler Standard Sieve. When the mesh size is within the range above, water may be flow out and oil may be selectively retrieved. When the mesh size exceeds 500 Mesh, the size of pore of the mesh may be extremely small, such that a speed at which water flowing therethrough may be substantially low, which may cause problems in oil-water separation efficiency, and when the mesh size is less than 10 Mesh, the size of pore of the mesh may be extremely large, such that oil may flow therethrough as well.

As a material for forming the substrate 1, at least one selected from a plastic, a fiber, a glass, a metal, a ceramic, and a carbon-based material may be used.

The plastic is not particularly limited and may include any one selected from polypropylene, polyethylene terephthalate, polyvinyl idene fluoride, polytetrafluoroethylene, a copolymer thereof, and a combination thereof.

The fiber may include natural fiber, synthetic fiber, or a combination thereof. The natural fiber may be, for example, cotton, linen, wool, silk, asbestos fiber, or a combination thereof. The synthetic fiber may be, for example, i) a regenerated fiber, such as rayon, modal, tencel, lyocell, and polynosic; ii) a semi-synthetic fiber, such as acetate and triacetate; iii) a polyamide-based synthetic fiber, such as nylon, Nomex, Kevlar and the like; a polyolefin-based synthetic fiber, such as polyethylene, polypropylene and the like; a polyester-based synthetic fiber, such as polyethylene terephthalate and the like; acryl synthetic fiber; a poly (meth) acrylate-based synthetic fiber; polyvinyl alcohol (PVA) synthetic fiber; polyurethane synthetic fiber; polyvinylchloride (PVC) synthetic fiber; polyvinylidene chloride (PVDC) synthetic fiber; polystyrene synthetic fiber; and an inorganic fiber such as glass fiber and the like, but it is not limited thereto.

The metal may be iron (Fe), aluminum (Al), stainless steel, copper (Cu), platinum (Pt), gold (Au), silver (Ag), titanium (Ti), silicon (Si), an alloy thereof, or a combination thereof.

The carbonaceous material may be graphite, carbon fiber, diamond, graphene, or a combination thereof.

At least one surface of the porous substrate 1 includes a plurality of protrusions 4a forming a nano-pattern. The protrusion 4a may have a diameter in a range from about 1 nm to about 100 nm, a length in a range from about 1 nm to about 10,000 nm, and an aspect ratio in a range from about 1 to about 100. The protrusion 4a may have a shape of nano-hair, nano-fiber, nano-pillar, nano-rod, or nano-wire, and forms a nano-pattern on a surface of the substrate 1. The nano-pattern may be formed uniformly on a surface of the substrate 1 having a large surface area by using the manufacturing method described below.

An inorganic particle 3 is disposed on at least some end of the protrusion 4a. A plurality of the inorganic particles 3 may be aggregated to form a cluster. Also, the inorganic particle 3 may be disposed on ends of almost all or all of the protrusions 4a; however, some of the inorganic particle 3 may be etched off during an etching process through a plasma treatment in the manufacturing method described below and thus, the inorganic particle 3 may not be disposed on ends of all protrusions 4a.

The inorganic particle 3 may include a metal or a metal oxide that may provide surface properties suitable for the purpose of oil-water separation. According to an embodiment, the inorganic particle 3 may include a metal or a metal oxide that provides hydrophilicity or superhydrophilicity, such that water may pass and oil may not pass through the oil-water separation structure. The metal or the metal oxide may be derived from a metal net structure used in the manufacturing method described below. For example, the inorganic particle 3 may include at least one selected from Ti, Cu, Au, Ag, chromium (Cr), Pt, Fe, Al, Si, an alloy thereof, and an oxide thereof. According to an embodiment, when the inorganic particle 3 including $TiO_2$ is disposed at an end of the protrusion 4a forming a nano-pattern, the nano-pattern having hydrophilicity itself may be modified to show even more superhydrophilicity.

The oil-water separation structure may have superhydrophilic properties of a contact angle of 20° or less with respect to water due to a chemical bonding between the surface of the substrate, on which the nano-pattern is formed, and the inorganic particle 3 that provides hydrophilicity.

The oil-water separation structure having such superhydrophilic surface has a very high surface energy, and thus, the oil-water separation structure may have oleophilicity with respect to oil that has low surface energy. However, oil may not be absorbed into the oil-water separation structure in water and may maintain a spherical bubble shape and thus, the oil-water separation structure may show superoleophobicity. Accordingly, the oil-water separation structure in water may have a contact angle of 140° or greater with respect to oil in water.

Hereinafter, a method of manufacturing the oil-water separation structure will be described in detail.

According to a method of manufacturing an oil-water separation structure according to an embodiment includes, providing a porous substrate;
placing a metal net structure above the substrate; and
plasma treating the substrate on which the metal net structure is placed.

The method of manufacturing the oil-water separation structure is not limited with regards to a surface area or a cross-sectional shape of the substrate and more particularly, the oil-water separation structure in which the nano-pattern is uniformly formed over the large surface area may be manufactured in a relatively simple and environmentally friendly manner.

Figure 2:
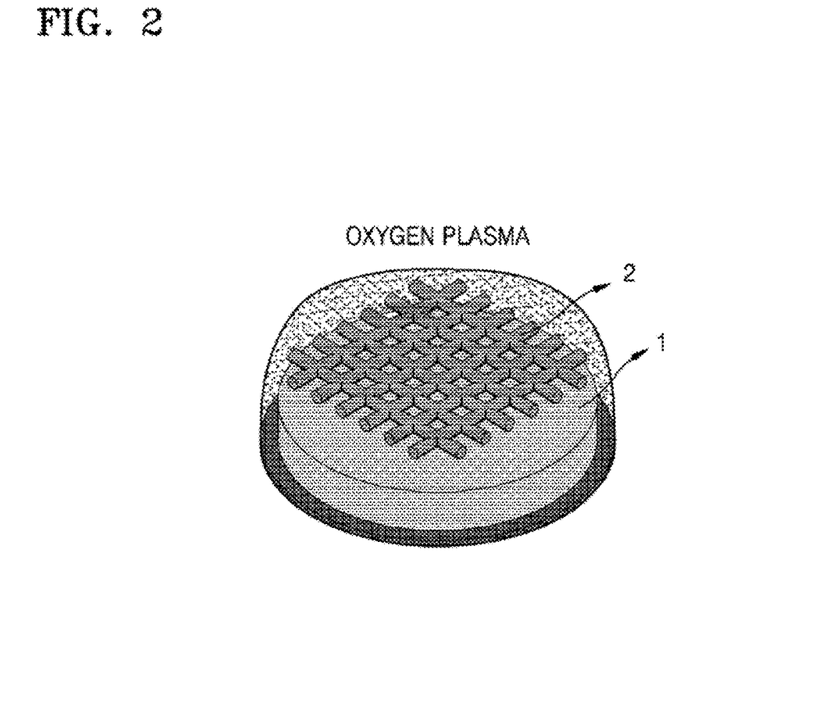
FIG. 2 is a schematic diagram for describing a method of manufacturing an oil-water separation structure according to an embodiment.

FIG. 2 is a schematic diagram for describing a method of manufacturing an oil-water separation structure according to an embodiment.

Figure 3A:
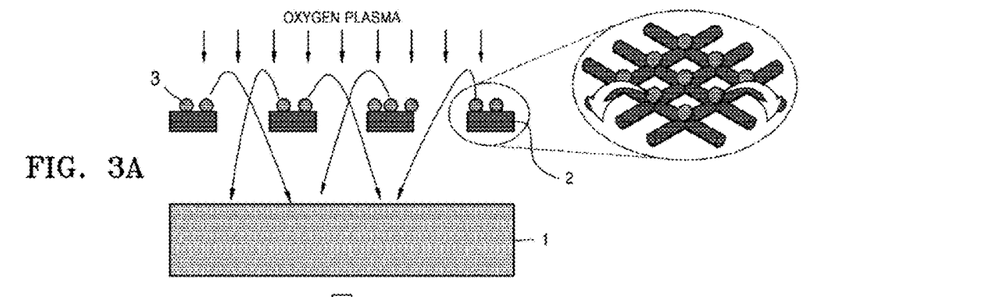
FIGS. 3A-3C show a step-by-step method of manufacturing an oil-water separation structure according to an embodiment.
Figure 3B:
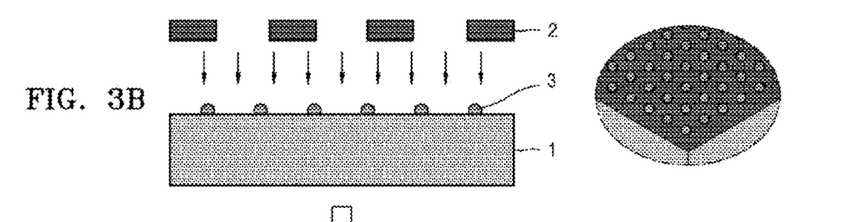
Figure 3C:
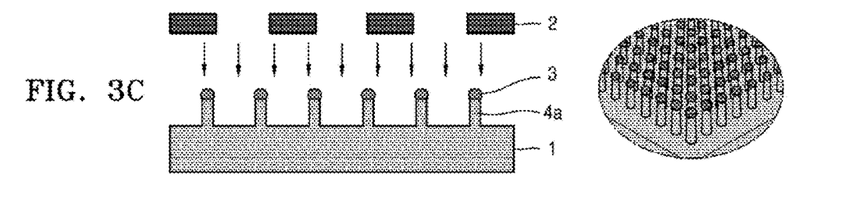

FIGS. 3A-3C shows a step-by-step method of manufacturing an oil-water separation structure according to an embodiment.

As shown in FIG. 2 and FIGS. 3A-3C, a metal net structure 2 is placed above the substrate 1 and then plasma treated. The type and shape of the substrate 1 is the same as the description of an oil-water separation structure according to an embodiment and thus, a detailed description thereof will be omitted herein.

The metal net structure 2 is not only a material for the inorganic particle 3, which will coat the surface of the oil-water separation structure, but is also used for uniformly depositing the inorganic particle 3 of a metal or a metal oxide disposed from the metal net structure 2 on the entire surface of the substrate 1 during a plasma treatment described below. In an alternate embodiment, the metal net structure covers a partial surface of the substrate. The inorganic particle 3 may act as a mask or an inhibitor for selectively etching a portion of the substrate 1 on which the inorganic particle 3 is not deposited and thus, a nano-pattern may be formed due to selective etching of the surface of the substrate 1. The use of the metal net structure 2 allows for a uniform deposition of the inorganic particle 3 on the entire surface of the substrate 1 and thus, the oil-water separation structure may be manufactured to have a large surface area.

The metal net structure 2 may include a metal or a metal oxide for providing suitable surface properties according to the purpose of oil-water separation. According to an embodiment, the metal net structure 2 may include a metal or a metal oxide for providing hydrophilicity or superhydrophilicity, which allows water to pass but does not allow oil to pass through the oil-water separation structure. For example, the metal net structure 2 may include at least one selected from Ti, Cu, Au, Ag, Cr, Pt, Fe, Al, Si, an alloy thereof, and an oxide thereof. According to an embodiment, in the case of a metal net structure 2 including Ti, a nano-pattern coated with $TiO_2$ particles is formed to transform the surface of the oil-water separation structure to have superhydrophilicity.

The metal net structure 2 may be anything that has a net structure for uniformly depositing the inorganic particle 3 of a metal or a metal oxide disposed from the metal net structure 2 on the entire surface of the substrate 1.

For example, the metal net structure 2 may be a metal mesh in which a metal wire is weaved into a mesh shape. Diameter and gap between metal wires forming the metal net structure 2 are not particularly limited and may be adjusted according to a desired nano-pattern structure. For example, a gap between the metal wires forming the metal net structure 2 may be in a range of about 10 μm to about 500 μm.

A size of the metal net structure 2 may be selected to suit the size of the substrate 1 for forming the nano-pattern.

When locating the metal net structure 2 on the substrate 1, the metal net structure 2 may be placed on the substrate 1 with a certain gap between the metal net structure 2 and the substrate 1. For example, a gap between the substrate 1 and the metal net structure 2 may be about 20 mm or less. When the gap between the substrate 1 and the metal net structure 2 is in the range described above, the inorganic particle 3 of a metal or a metal oxide disposed from the mesh net structure 2 may be dropped onto a surface of the substrate 1 right below the metal net structure 2 and may be uniformly deposited over the entire surface of the substrate 1. In an alternate embodiment, the metal net structure 2 covers a partial surface of the substrate. When the metal net structure 2 contact the substrate 1, a portion of the substrate 1 that contact the metal net structure 2 may not be etched due to a plasma treatment, and thus, as a portion in which the nano-pattern is not formed increases, the oil-water separation structure may have decreased oil-water separation efficiency. Accordingly, the metal net structure 2 may preferably not contact the surface of the substrate 1.

Thereafter, the substrate 1 on which the metal net structure 2 is disposed is plasma treated. Due to the plasma treatment, the surface of the substrate 1 may have hydrophilicity or superhydrophilicity.

According to an embodiment, the plasma treatment may include
depositing metal or metal oxide particles disposed from the metal net structure on a surface of the substrate through a plasma treatment; and
etching residual portions other than portions on which the metal or metal oxide particles are deposited from the surface of the substrate through the plasma treatment.

As shown in FIGS. 3A-3C, after the plasma treatment, inorganic particle 3 of metal or metal oxide detached from the metal net structure 2 are deposited on the surface of the substrate 1. The inorganic particle 3 may form a cluster during the plasma treatment.

When the substrate 1 on which the inorganic particle 3 of the metal or metal oxide is deposited is continuously plasma treated, a portion in which the inorganic particle 3 of the metal or metal oxide is not deposited may be selectively etched to form a nano-patterned structure on the surface of the substrate 1.

In more detail, a portion in which the inorganic particle 3 of the metal or metal oxide is deposited on the surface of the substrate 1 acts as an inhibitor for etching of plasma and thus, a speed of etching in that portion is substantially low, a portion in which the inorganic particle 3 of the metal or metal oxide is not deposited on the surface of the substrate 1 may be etched by plasma and thus, a speed of etching in that portion may be high. As a result, a nano-pattern formed of a first protrusion 4a having a shape of nano-hair, nano-fiber, nano-pillar, nano-rod, or nano-wire may be formed on the surface of the substrate 1.

Depositing of the inorganic particle 3 of the metal or metal oxide and etching of the substrate 1 may be simultaneously performed under the same plasma treatment conditions.

As shown in FIGS. 3A-3C, during the etching through the plasma treatment, the metal net structure 2 may not be removed and may be continuously maintained above the substrate 1. During the etching through the plasma treatment, the inorganic particle 3 of the metal or metal oxide deposited on the substrate 1 may also be scraped off little by little due to sputtering and thus, the inorganic particle 3 that acts as an inhibitor needs to be continuously supplied during a long period of etching. Accordingly, the metal net structure 2 may not be removed and may be continuously plasma treated to continuously supply the inorganic particle 3 of the metal or metal oxide and maintain the cluster.

Conditions and treatment duration of the plasma treatment may be adjusted to form various shapes of the nano-patterned structure.

The plasma treatment may be performed in the presence of at least one gas selected from $O_2$, $CF_4$, Ar, $N_2$, and $H_2$. Among these, when $O_2$ gas is used, $O_2$ gas may bind to the surface of the substrate 1 due to the plasma treatment to provide durable hydrophilicity to the surface of the substrate 1. Meanwhile, pressure during the plasma treatment may be, for example, from about 1 mTorr to about 1000 mTorr, and a higher atmospheric pressure may be used.

The plasma treatment may be performed at a voltage range from about −100 V to about −1000 V, for duration from about 10 seconds to about 5 hours under the pressure of about 1 mTorr to about 1000 mTorr. The longer the plasma treatment duration, the more likely that the surface of the substrate may change from hydrophilic to superhydrophilic. According to an embodiment, when the plasma treatment duration is longer, superhydrophilicity of the surface of the substrate may increase and a contact angle of the surface of the substrate with respect to water may be 20° or less, 10° or less, 5° or less, or even 1° or less. In this regard, when a contact angle between the surface of the substrate to pure water is 20° or less, the surface of the substrate 1 is defined as having hydrophilicity and when the contact angle is 10° or less, the surface of the substrate 1 is defined as having superhydrophilicity.

The method of manufacturing the oil-water separation structure is environmentally friendly and may be surface-treated over a large surface area to manufacture an oil-water separation structure having a large surface area.

The oil-water separation structure manufactured as described above may be applied to various oil-water separators.

An oil-water separator according to an embodiment may include the oil-water separation structure described above. The oil-water separator may include the oil-water separation structure to be manufactured into a means or a structure suitable for the purpose of oil-water separation.

According to an embodiment, the oil-water separator may further include a reinforcement material that supports the oil-water separation structure. The reinforcement material supports the oil-water separation structure, such that the oil-water separation structure may not be transformed by oil that may be generated during the oil-water separation process or high pressure applied from outside. The reinforcement material may be formed as at least one from a metal rod, a metal mesh, a polymer rod, and a polymer mesh. The reinforcement material may be disposed on the opposite side of a portion in which oil is collected in the oil-water separation structure, in other words, on the side in which water flows out. The oil-water separator may have improved structural stability due to the reinforcement material. The reinforcement material may also be used by forming a nano-pattern comprised of a plurality of protrusions on at least one surface through the plasma treatment described above.

According to an embodiment, the oil-water separation structure may be applied to a landing net for scooping out oil on water. The landing net may include the oil-water separation structure and a support frame for supporting the oil-water separation structure.

Figure 4:
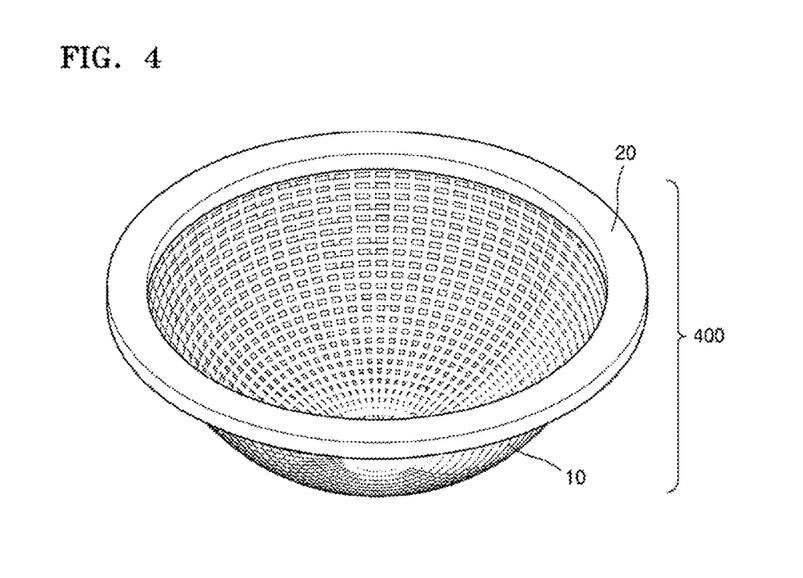
FIG. 4 is a perspective view showing an external appearance of a landing net according to an embodiment.
Figure 5:
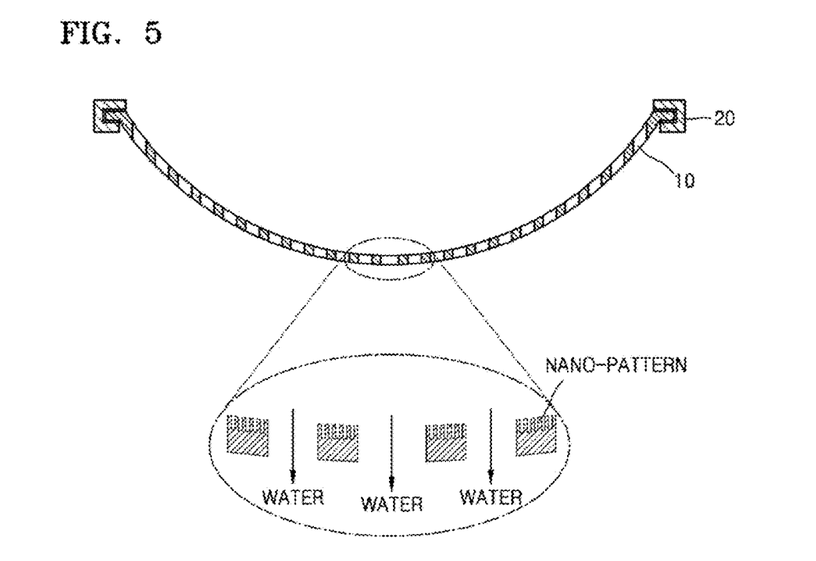
FIG. 5 is a schematic view showing a cross-section of the landing net in FIG. 4.

FIG. 4 is a perspective view showing an external appearance of a landing net 400 according to an embodiment and FIG. 5 is a schematic view showing a cross-section of the landing net in FIG. 4.

Referring to FIGS. 4 and 5, the landing net 400 according to an embodiment includes an oil-water separation structure 10 and a support frame 20 supporting the oil-water separation structure 10. The oil-water separation structure 10 may be fixed on the support frame 20. When the oil-water separation structure 10 has sufficient rigidity by itself, an additional support frame 20 is not needed. The landing net may further include a handle.

The oil-water separation structure 10 fixed on the support frame 20 may have curvature on the entire external surface thereof to increase retrieval efficiency of volatile oil. For example, the oil-water separation structure 10 may have a semi-spherical shape on the entire external surface. However, the shape of the oil-water separation structure 10 is not particularly limited, for example, the oil-water separation structure may have a cylindrical shape with a flat floor or a rectangular box shape.

As shown in FIG. 5, the interior of the landing net may be plasma treated as described above to form a nano-pattern, such that only water may pass through the holes formed on the oil-water separation structure of the landing net to selectively retrieve oil.

According to an embodiment, the oil-water separation structure may be applied to an oil fence. An oil fence including the oil-water separation structure may be used to prevent diffusion of oil leaked due to sailing of a ship, sinking of a ship, or a tanker accident on land, oil leaked from oil refinery, oil storage, oil pipeline, gas station, or the like, into the beach via the ocean, stream, or river.

Also, the oil fence including the oil-water separation structure may be installed to lock up oil into one place after an oil spillage. The oil fence has superhydrophilicity on the surface of the oil fence and a water membrane formed after wetting the oil fence in water has super oil repellency and thus, oil collected in the oil fence may be used to easily retrieve the oil by using an oil-water separator of different shape.

An oil-water separation method according to an embodiment includes selectively passing water and retrieving oil from a mixture of water and oil by using an oil-water separator.

When the oil-water separation structure shows hydrophilicity or superhydrophilicity, the oil-water separator has high wettability and passes water therethrough easily. Accordingly, when liquid in which oil and water are mixed is passed through the oil-water separator, water may easily pass through the oil-water separation structure, but oil may not pass through the oil-water separation structure due to its repulsive force against water, and thus, oil may be collected on the oil-water separation structure.

According to an embodiment, an oil-water separation process may further include pre-treating the oil-water separator by wetting the oil-water separator in water before using the oil-water separator. Through wetting the oil-water separator in water, a water membrane may be formed on a surface of the oil-water separation structure for a more efficient collecting of the oil on the water membrane.

According to an embodiment, after retrieving the oil, the oil-water separation process may further include UV treating the oil-water separator. The UV treatment may further improve hydrophilicity of an inorganic particle coated on a nano-pattern and an oil-water separator that was used for more than once may be repeatedly used through the UV treatment.

Hereinafter, the present invention will be described in greater detail through the embodiments below.

A morphological structure of the surfaces of the oil-water separation structure manufactured in Examples and Comparative Examples below were investigated by using a scanning electron microscope (SEM, FEI, Nova NanoSEM 200, USA). A contact angle with respect to water of the oil-water separation structure was measured by using a contact angle meter (Goniometer, Rame-Hart, USA). Volume of each water drop used for measuring a static contact angle was 8 µl. An average contact angle value was obtained at 5 different locations in the same sample.

Comparative Example 1

As a porous substrate, a circular polyethylene terephthalate non-woven fabric (manufactured by: SK Chemical) having a diameter of 160 mm and a thickness of 1 mm was used without a plasma treatment, which was then applied to an oil-water separation structure.

Example 1

As a porous substrate, a circular polyethylene terephthalate non-woven fabric (manufactured by: SK Chemical) having a diameter of 160 mm and a thickness of 1 mm was used.

As a metal mesh, a circular Ti mesh (available from Nilaco Co., Ltd, diameter: 160 mm, wire gap: 320 µm, and wire diameter: 180 µm) was used, and as a plasma treatment apparatus, a radio-frequency generator (manufactured by: Advanced Energy and product name: RTX-600) was used.

First, the substrate was disposed on a cathode in a chamber of the plasma treatment apparatus (not shown). The Ti mesh was disposed at a gap of 2 mm above the substrate, and a support fixture was stacked on a mesh border for fixing a mesh and the mesh was disposed on the support fixture to adjust a distance between the mesh and the substrate. Thereafter, a plasma treatment was performed under the conditions of voltage at −400 V, pressure at 50 mTorr, and $O_2$ gas at 10 sccm for 30 minutes to manufacture an oil-water separation structure.

Figure 6:
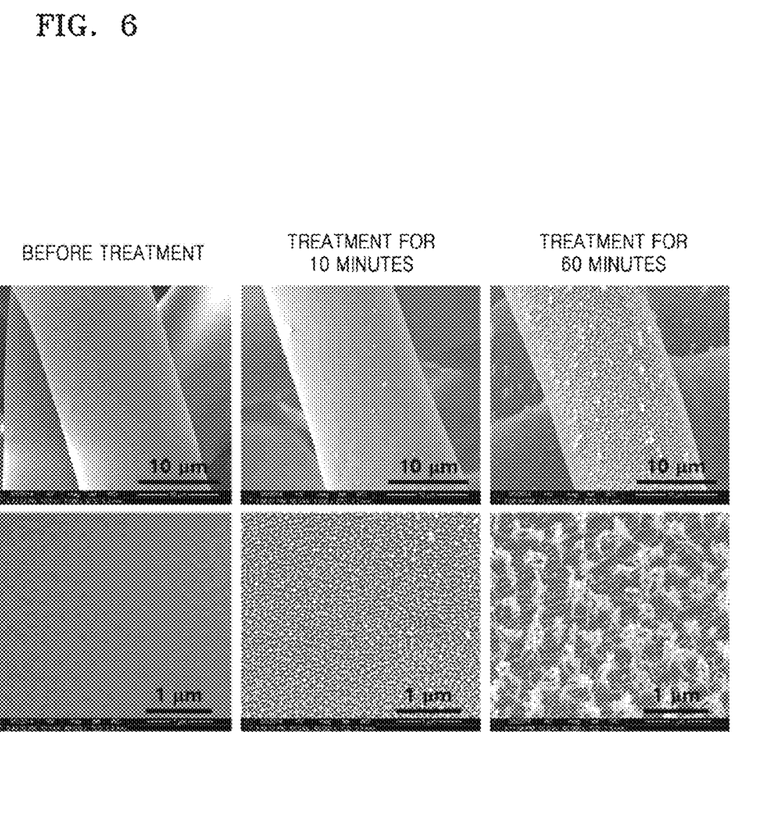
FIG. 6 is a scanning electron microscope (SEM) image showing step-by-step processes for forming a nano-pattern according to the oxygen plasma treatment time in Example 1.

FIG. 6 is a scanning electron microscope image (SEM) showing step-by-step processes for forming a nano-pattern according to oxygen plasma treatment time in Example 1 before plasma treatment and after 10 minutes and 60 minutes of plasma treatment respectively. As shown in FIG. 4, it may be concluded that a height of a protrusion of a nano-pattern formed on the non-woven fabric fiber was formed in a range from about 10 nm to about 1 mm in proportion to a plasma treatment time.

Figure 7:
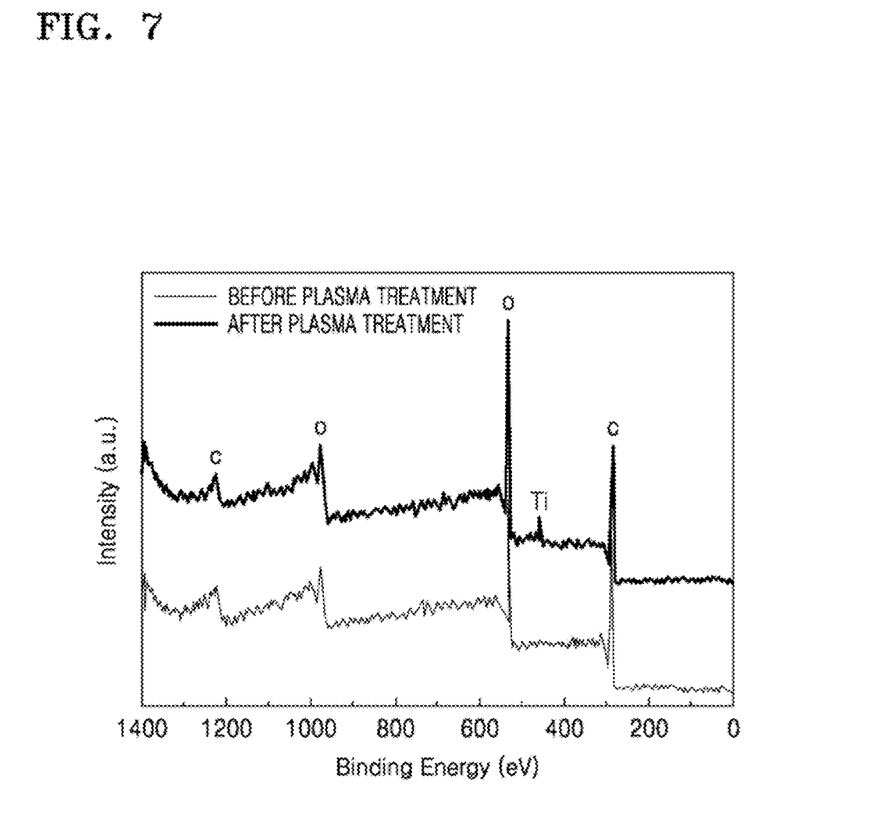
FIG. 7 shows analysis results of surface components of the oil-water separation structures manufactured in Comparative Example 1 and Example 1 by using an x-ray photoelectron spectroscopy (XPS)

FIG. 7 shows analysis results of surface components of the oil-water separation structures manufactured in Comparative Example 1 and Example 1 by using an x-ray photoelectron spectroscopy (XPS). As shown in FIG. 7, it may be concluded that when $O_2$ plasma treatment was performed by using the Ti mesh, $TiO_2$ was formed on the surface of the substrate. Meanwhile, it may be concluded that when the plasma treatment was not performed, results with respect to metal elements were absent on the surface of the substrate.

Figure 8A:
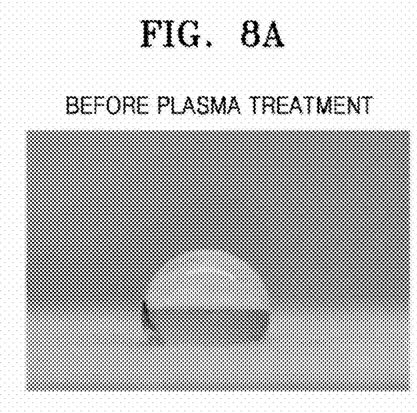
FIGS. 8A and 8B are comparative images showing wettability with respect to water of the oil-water separation structures manufactured in Comparative Example 1 and Example 1.
Figure 8B:
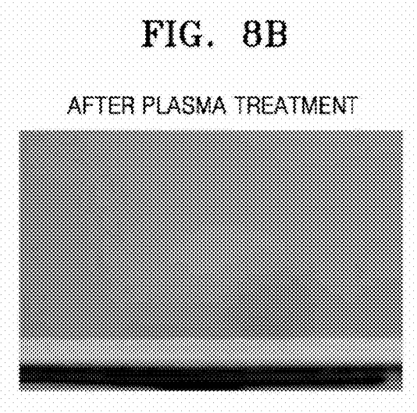
Figure 8C:
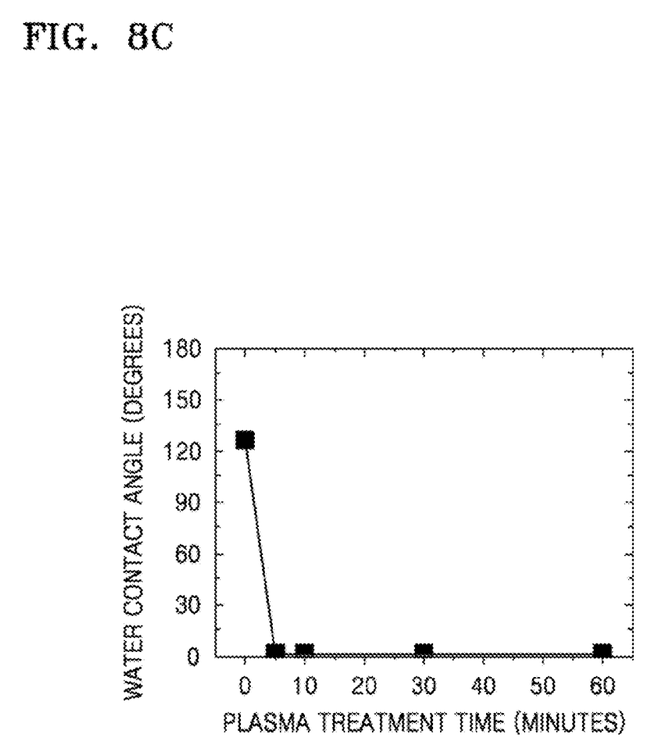
FIG. 8C is a graph showing measurement results for contact angles with respect to water of the oil-water separation structures manufactured in Comparative Example 1 and Example 1 according to plasma treatment time.

FIGS. 8A and 8B are comparative images showing wettability of the oil-water separation structures manufactured in Comparative Example 1 and Example 1 with respect to water. FIG. 8C is a graph showing measurement results for contact angles with respect to water of the oil-water separation structures manufactured in Comparative Example 1 and Example 1 according to plasma treatment time.

As shown in FIGS. 8A, 8B, and 8C, the porous substrate before the plasma treatment has hydrophobicity and a contact angle of 126° with respect to water and thus, water may only exist on the surface of the porous substrate as water may not pass through pores. However, after the plasma treatment, the number of chemical bonds showing hydrophilicity increases on the surface of the porous substrate and thus, contact angle of the surface of the porous substrate with respect to water is 0°, which allows water to pass through pores of the porous substrate, which suggests that water may flow out to the bottom of the porous substrate due to gravity when there is a sufficient amount of water.

Figure 9A:
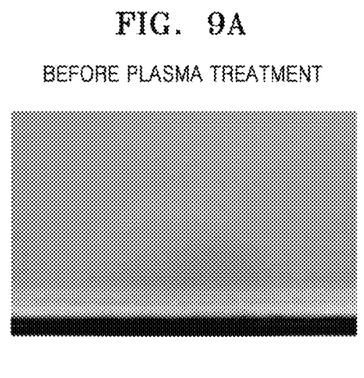
FIGS. 9A and 9B are comparative images showing wettability with respect to oil in air of the oil-water separation structures manufactured in Comparative Example 1 and Example 1.
Figure 9B:
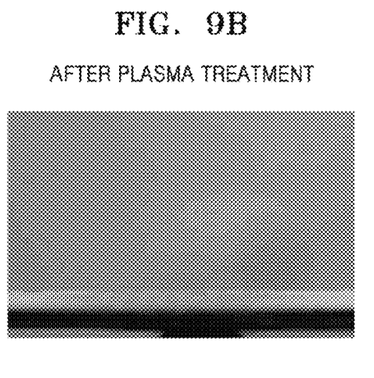
Figure 9C:
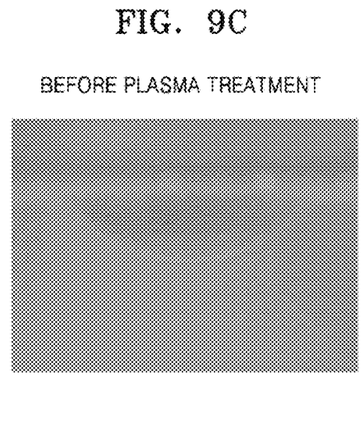
FIGS. 9C and 9D are comparative images showing wettability with respect to oil in water of the oil-water separation structures manufactured in Comparative Example 1 and Example 1.
Figure 9D:
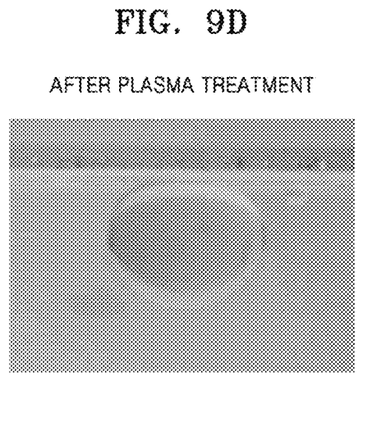
Figure 9E:
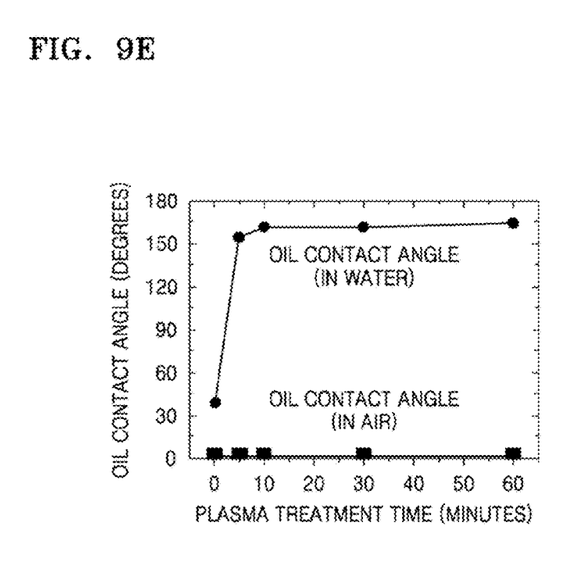
FIG. 9E is a graph showing measurement results for contact angles with respect to water of the oil-water separation structures manufactured in Comparative Example 1 and Example 1 according to plasma treatment time.

FIGS. 9A and 9B are comparative images showing wettability 1 with respect to oil in air of the oil-water separation structures manufactured in Comparative Example 1 and Example, FIGS. 9C and 9D are comparative images showing wettability with respect to oil in water of the oil-water separation structures manufactured in Comparative Example 1 and Example 1. FIG. 9E is a graph showing measurement results for contact angles with respect to water of the oil-water separation structures manufactured in Comparative Example 1 and Example 1 according to plasma treatment time.

As shown in FIGS. 9A and 9B, it may be concluded that the oil-water separation structures absorb oil well in the air before and after the plasma treatment. Hydrophilization of the surface of the oil-water separation structures through $O_2$ plasma leads to a very high surface energy and more oleophilicity with respect to oil, which has low surface energy. However, after the plasma treatment, oil is not absorbed into the surface of the oil-water separation structures in water, and the oil shows superoleophobicity and maintains a spherical droplet shape As shown in FIGS. 9C and 9D, the porous substrate before the plasma treatment does not have a water membrane formed on the surface of the porous substrate and thus, oil contacted the porous structure and formed a contact angle of 40°. On the other hand, the plasma treated porous substrate showed increased hydrophilicity, which increased binding strength of the water membrane to the porous substrate, such that oil may not directly contact the porous substrate due to the water membrane formed on the surface of the porous substrate and thus, the plasma treated porous substrate showed superoleophobicity with a contact angle of 165°. Such superoleophobic phenomenon in water may be explained through an equation with respect to 3-phases system including solid/water/oil represented below [Cheng et al, ACS Applied Materials & Interfaces, 21 (2013), 11363-70].

$$\cos \theta_{ow} = \frac{\gamma_{oa} \cos \theta_o - \gamma_{wa} \cos \theta_w}{\gamma_{ow}}$$

$\theta_w$, $\theta_o$, $\theta_{ow}$: contact angles of water in air, oil in air, and oil in water $\gamma_{ow}$, $\gamma_{wa}$, $\gamma_{oa}$: surface tensions of oil/water, water/air, and oil/air When a hydrophilic group is formed on the surface of the porous substrate through a plasma treatment, $\theta_w$ decreases and $\theta_{aw}$ increases. In this regard, $\gamma_{ow}$, $\gamma_{wa}$, $\gamma_{oa}$ are all constants, and $\theta_\alpha$ is 0° before and after the plasma treatment.

Figures 10A, 10B:
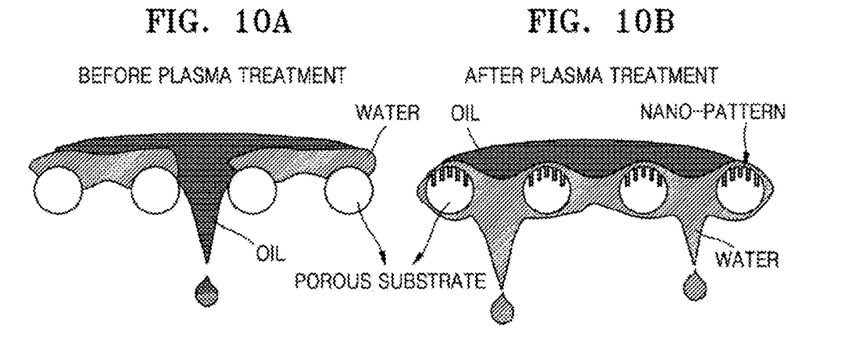
FIGS. 10A and 10B shows oil-water separation concept of a landing net by using the conventional non-woven fabric used in Comparative Example 1 ((FIG. 10A before plasma treatment) and the oil-water separation structure manufactured in Example 1 (FIG. 10B after plasma treatment)
Figure 11A:
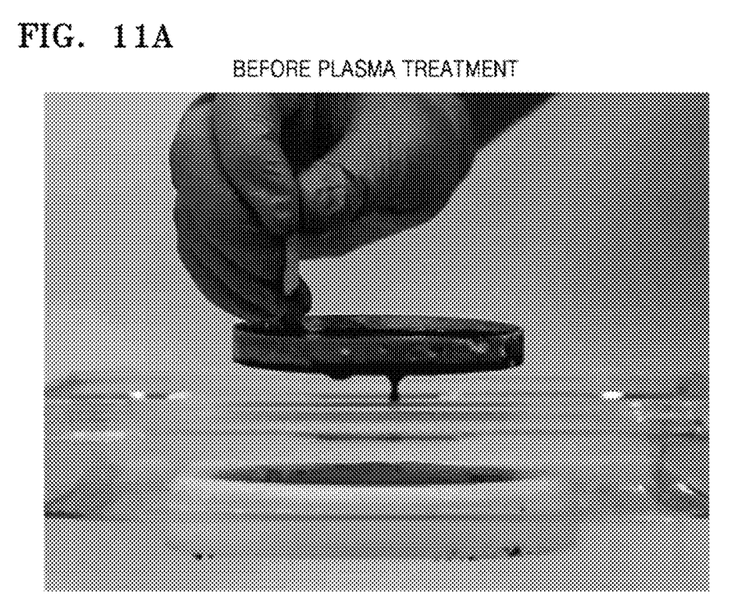
FIG. 11A is an image showing oil-water separation effects of a landing net by using the conventional non-woven fabric used in Comparative Example 1 (FIG. 11A before plasma treatment)
Figure 11B:
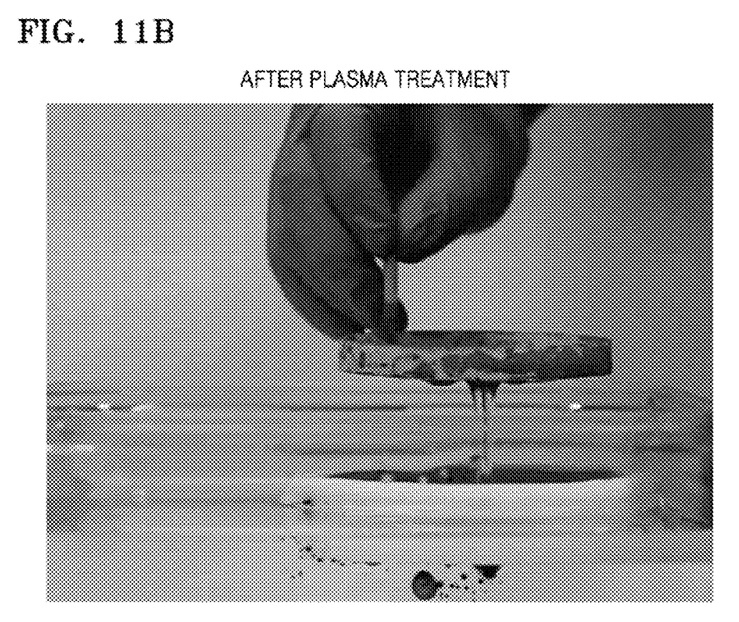
FIG. 11B is an image showing oil-water separation effects of a landing net by using the oil-water separation structure manufactured in Example 1 (FIG. 11B after plasma treatment).

FIGS. 10A and 10B show oil-water separation concept and effect of a landing net by using the conventional non-woven fabric used in Comparative Example 1 ((a) before plasma treatment) and the oil-water separation structure manufactured in Example 1 ((b) after plasma treatment).

As shown in FIGS. 10A and 10B, in the case of the conventional non-woven fabric that is not plasma treated used in Comparative Example 1, the surface of the porous substrate having a curvature showed hydrophobicity and water and oil were mixed on the porous substrate, as the water did not pass through pores of the porous substrate. If oil has a lower specific gravity than water, as in the case of crude oil generally spilled in the ocean, the oil floats on water and becomes confined in the curvature of the porous substrate with water and thus, an oil-water separation may not occur. However, a nano-pattern having superhydrophilicity is formed on the surface of the plasma-treated porous substrate manufactured in Example 1 and thus, when water and oil are scooped out together by using the porous substrate formed nano-pattern thereon, water, which has higher specific gravity than oil, contacts the surface of the hydrophilic porous substrate earlier than oil, and as a result, a water membrane coating on the porous substrate may be formed due to a strong binding between the water and the substrate and remaining water flows out to the bottom due to gravity. Thereafter, the oil contacts the water membrane formed on the surface of the porous substrate and the oil is separated out as the oil may not pass through the pores and remain on the porous substrate due to the resistance of the water membrane. When such concept is used for scooping out oil by using the landing net upon oil spillage in water, the water may pass through the mesh of the landing net and remaining oil may be scooped out and stored in an oil container. Such separated oil may be reused as it is.

As described above, according to the one or more of the above embodiments of the present invention, the oil-water separation structure has hydrophilic or superhydrophilic surface properties, to selectively pass water from a mixture of water and oil, and oil may be easily separated and retrieved. A manufacturing process of the oil-water separation structure is environmentally friendly and the oil-water separation structure may be manufactured into a large surface area. The oil-water separator including the oil-water separation structure may be repeatedly used and prevent additional environmental pollution.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. An oil-water separation structure comprising:
    a porous substrate comprising a plurality of protrusions forming a nano-pattern on at least one outer surface of the porous substrate; and
    an inorganic particle disposed at an end of at least some portions of the protrusions.

2. The oil-water separation structure of claim 1, wherein the protrusion has a shape of nano-hair, nano-fiber, nano-pillar, nano-rod, or nano-wire.

3. The oil-water separation structure of claim 1, wherein the protrusion has a diameter in a range from about 1 nm to about 100 nm, a length in a range from about 1 nm to about 10,000 nm, and an aspect ratio in a range from about 1 to about 100.

4. The oil-water separation structure of claim 1, wherein the inorganic particle comprises at least one selected from titanium (Ti), copper (Cu), gold (Au), silver (Ag), chromium (Cr), platinum (Pt), iron (Fe), aluminum (Al), silicon (Si), an alloy thereof, and an oxide thereof.

5. The oil-water separation structure of claim 1, wherein the inorganic particle comprises TiO2.

6. The oil-water separation structure of claim 1, wherein the substrate has a curved shape and the nano-pattern is formed on at least some concave portions of the curved shape.

7. The oil-water separation structure of claim 1, wherein the substrate has a non-woven fabric, a woven fabric, or a net shape.

8. The oil-water separation structure of claim 1, wherein the substrate has about 10 Mesh to about 500 Mesh size based on Tyler Standard Sieve.

9. The oil-water separation structure of claim 1, wherein the substrate comprises at least one selected from a plastic, a fiber, a glass, a metal, a ceramic, and a carbon-based material.

10. The oil-water separation structure of claim 9, wherein the plastic comprises at least one selected from polypropylene, polyethylene terephthalate, polystyrene, polymethyl methacrylate, polyvinylidene fluoride, polytetrafluoroethylene, and a copolymer thereof.

11. The oil-water separation structure of claim 9, wherein the fiber comprises natural fiber, synthetic fiber, or a combination thereof.

12. The oil-water separation structure of claim 11, wherein the natural fiber comprises at least one selected from cotton, linen, wool, silk, and asbestos, and the synthetic fiber comprises at least one selected from rayon, modal, tencel, lyocell, polynosic, acetate, triacetate, polyimide-based, polyolefin-based, polyester-based, acryl, poly (meth) acrylate-based, polyvinyl alcohol (PVA), polyurethane, polyvinylchloride (PVC), polyvinylidene chloride (PVDC), polystyrene, glass fiber, and a copolymer thereof.

13. The oil-water separation structure of claim 9, wherein the metal comprises at least one selected from iron (Fe), aluminum (Al), stainless steel, copper (Cu), platinum (Pt), gold (Au), silver (Ag), titanium (Ti), silicon (Si), and an alloy thereof.

14. The oil-water separation structure of claim 9, wherein the carbon-based material comprises at least one selected from graphite, carbon fiber, diamond, and graphene.

15. The oil-water separation structure of claim 1, wherein the oil-water separation structure has a contact angle of 20° or less with respect to water in air.

16. The oil-water separation structure of claim 1, wherein the oil-water separation structure has a contact angle of 140° or greater with respect to oil in water.

17. The oil-water separation structure of claim 1, wherein the plurality of protrusions is repeatedly disposed with uniform gaps therebetween over a partial surface of the substrate.

18. An oil-water separator comprising:
    an oil-water separation structure, the oil-water separation structure comprising a porous substrate comprising a plurality of protrusions forming a nano-pattern on at least one outer surface of the porous substrate; and an inorganic particle disposed at an end of at least some portions of the protrusions.

19. The oil-water separator of claim 18, further comprising a reinforcement material for supporting the oil-water separation structure.

20. A landing net comprising:

an oil-water separation structure, the oil-water separation structure comprising a porous substrate comprising a plurality of protrusions forming a nano-pattern on at least one outer surface of the porous substrate; and an inorganic particle disposed at an end of at least some portions of the protrusions.

21. The landing net of claim 20, further comprising a supporting frame for fixing the oil-water separation structure.

22. An oil fence comprising:

an oil-water separation structure, the oil-water separation structure comprising a porous substrate comprising a plurality of protrusions forming a nano-pattern on at least one outer surface of the porous substrate; and an inorganic particle disposed at an end of at least some portions of the protrusions.

* * * * *